Aug. 4, 1959　　A. E. CRANSTON, JR　　2,897,948
ELEVATING TURNTABLE FOR CONVEYORS
Filed Aug. 20, 1957　　4 Sheets-Sheet 1
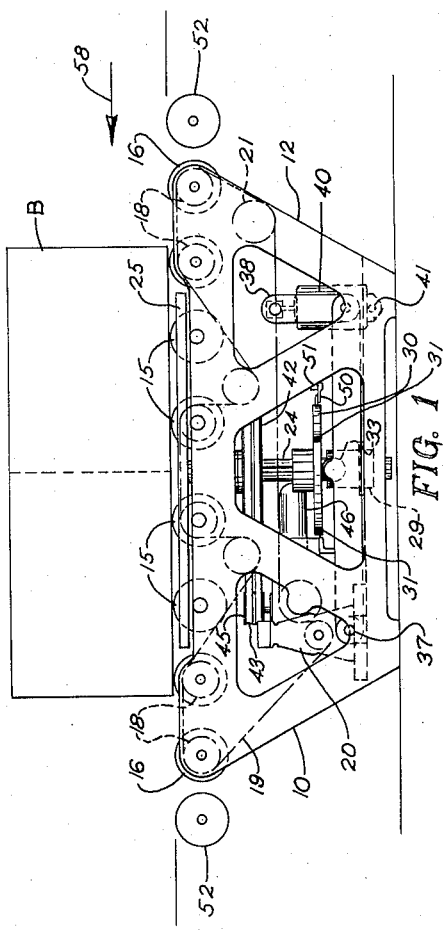
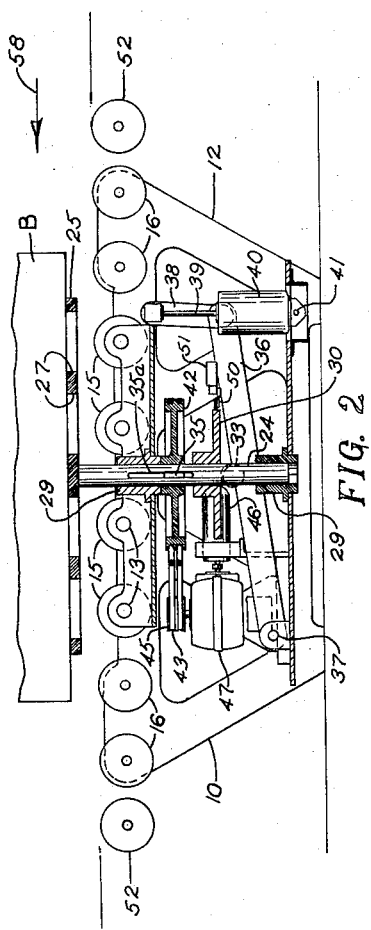
INVENTOR.
ALBERT E. CRANSTON JR.
BY
Cook and Schermerhorn
Attys

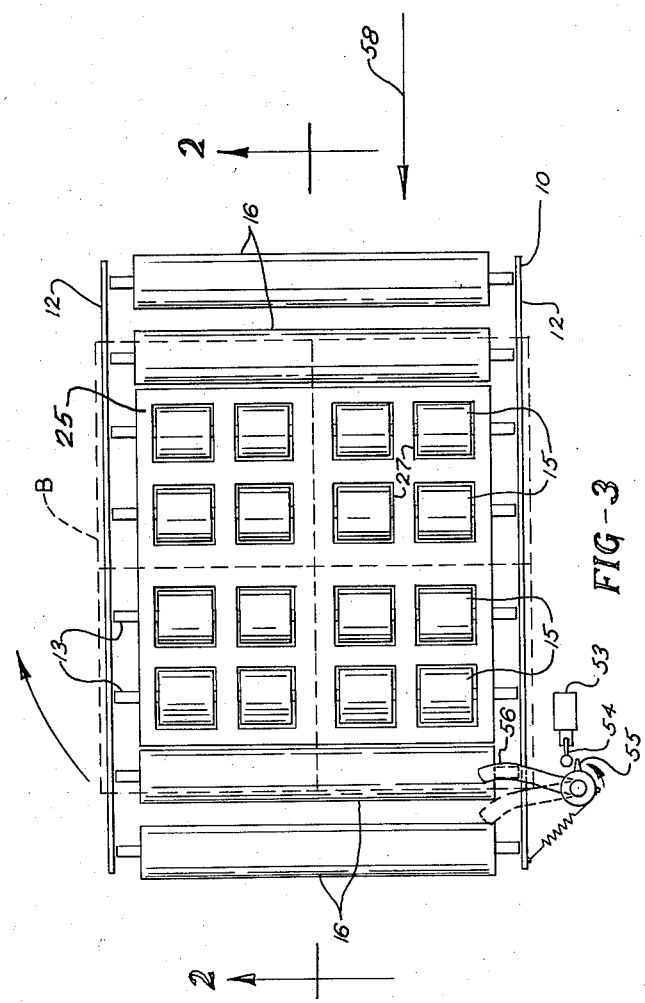

INVENTOR.
ALBERT E. CRANSTON JR.

*INVENTOR.*
ALBERT E. CRANSTON JR.
BY
Cook and Schermerhorn
Attys

United States Patent Office
2,897,948
Patented Aug. 4, 1959

2,897,948

ELEVATING TURNTABLE FOR CONVEYORS

Albert E. Cranston, Jr., Oak Grove, Oreg.

Application August 20, 1957, Serial No. 679,285

13 Claims. (Cl. 198—33)

This invention relates to a turntable, and is more particularly concerned with turntable structure capable of momentarily raising a load off a conveyor, and, while so raised, rotating the load through a predetermined angle of rotation.

A principal object of the present invention is to provide a turntable machine having novel bundle handling means, and, more specifically, to provide a turntable machine having means for readily receiving bundles and lifting and turning them through a predetermined angle of rotation before discharging them on associated conveyor mechanism.

Another object is to provide a turntable machine which is capable of automatic operation wherein, when a bundle is deposited thereon, said bundle is located in a predetermined position in relation thereto and turned through a predetermined angle, and then discharged from the machine.

Another object is to provide a device for turning bundles through 90° to receive bindings applied in two different direction about the bundles.

Another object is to provide a device for turning a plurality of stacks of material between successive binding or strapping operations wherein crossed bindings are applied to secure the stacks together in a single bundle.

More specifically, objects of the invention are to provide a machine of the type described which employs a bundle engaging turntable platform having a grid-like structure capable of assuming a position lower than conveyor rolls on said mechanism so that, depending upon the vertical adjustable position of said platform, a bundle will either rest thereon or on said rollers; which has improved means for raising the platform above the rollers and for turning the platform through a predetermined angle of rotation; and which has an improved electrical system for initiating the various functions of the machine at the proper time in automatic operation.

These objects are achieved by machine structure having suitable framework supporting transverse driven and idle rollers by means of which bundles are supported and moved into and out of a turning position. A turntable platform having vertical movement is associated with these rollers in such a way that it can lift the bundle off the rollers, turn it a desired amount, and then re-deposit it on the rollers. The machine has drive and control means capable of operating it through a proper sequence, comprising moving the bundle to a position over the turntable platform, stopping the conveyor rollers on the machine, elevating the platform to raise the bundle off the drive rollers, rotating the platform to position the bundle as desired, lowering the platform to re-deposit the bundle on the conveyor drive rollers, and then placing the conveyor rollers back in operation to carry the bundle in its turned position off the machine.

The invention will be better understood and additional objects and advantages will become apparent from the following description taken in connection with the accompanying drawings which illustrate a preferred form of the invention. It is to be understood, however, that the invention may take other forms, and that all such modifications and variations within the scope of the appended claims which will occur to persons skilled in the art are included in the invention.

In the drawings:

Figure 1 is a side elevational view of the machine with a bundle supported on the conveyor drive rolls;

Figure 2 is a longitudinal sectional view through the machine, taken on the line 2—2 of Figure 3, showing a bundle raised off the conveyor by the turntable platform;

Figure 3 is a top plan view of the machine;

Figures 4, 5:
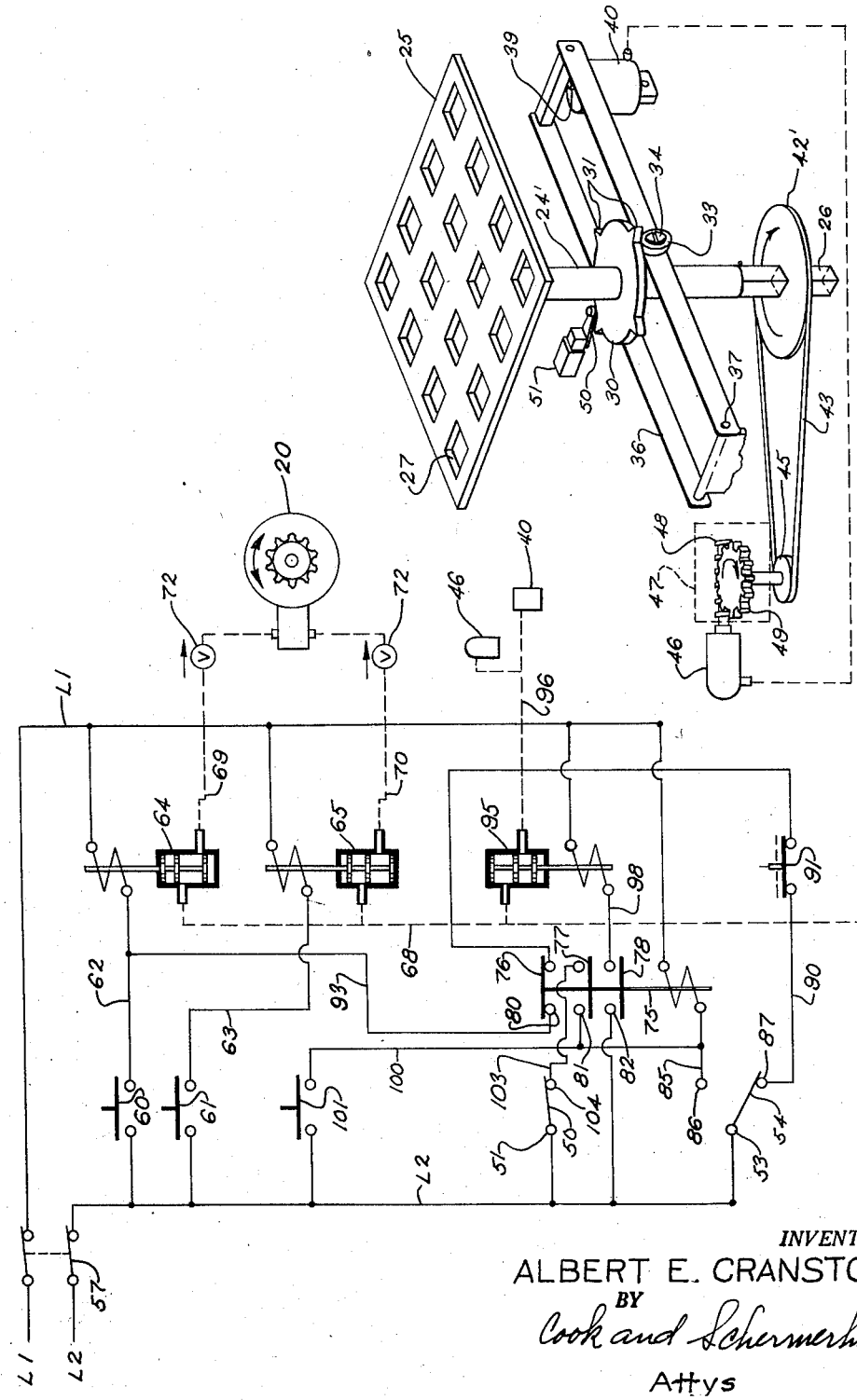
Figure 4 is a schematic perspective view of a modified form of turntable platform operating means shown apart from the rest of the apparatus.
Figure 5 is a wiring diagram for the machine.

Referring specifically to the drawings, the present turntable machine is designated generally by the numeral 10 and comprises side frame structures 12 supporting a plurality of transverse shafts 13. Mounted on each of the four centermost shafts are a plurality of spaced short rollers 15 having a quartered symmetrical arrangement, and mounted on the remaining shafts are full length rollers 16. Rollers 15 each have a length equal to the diameter. Some of the shafts 13 are driven and some are idle, and, although the particular arrangement of driven and idle shafts may vary, the two centermost shafts are shown as being driven, the two shafts adjacent thereto are idle and the remaining shafts are driven. The driven shafts are provided with sprockets 18, Figure 1, for a continuous chain 19 driven by a reversible air motor 20, the chain 19 also being trained over idle sprockets 21.

As best seen in Figures 1 and 2, the conveyor rollers project above the side frames of the machine, and bundles, designated by the letter B, may be conveyed onto and off the machine by means of said rollers. The conveyor may be driven in either direction by the reversible motor 20 whereby it may carry the bundle through the machine from one end to the other or it may be reversed after the bundle has been turned to discharge the bundle from the same end from which it entered. A preferred usage, however, is to move the bundle through the machine in a continuous line of travel.

Supported on a vertical shaft or post 24 is a turntable platform 25 having a plurality of square openings 27 therein, Figure 3, arranged in the same symmetrical pattern as the rollers 15 on the four centermost shafts whereby these openings are adapted to overlie the rollers 15 in each quarter turn position of the turntable. These openings receive the rollers 15 in a lowered position of the turntable platform and the platform is thus capable of moving to a plane lower than the tops of said rollers whereby bundles may be moved by the conveyor over the platform. Shaft 24 is slidably mounted in upper and lower bushings or bearings 29.

Secured in a fixed position on the shaft 24 is a lift plate 30 having cam lobes or projections 31, Figure 1, spaced 90° apart on the periphery thereof, and engageable with the bottom surface of plate 30 is a pair of lift wheels 33 suitably journaled on shafts 34 fixed to spaced parallel lever arms 36. One end of each lever arm 36 is pivotally mounted to the machine frame by a pin 37 and the opposite end is attached to the end of a piston rod 39 projecting from an air cylinder 40 pivotally attached to the machine frame at 41, Figures 1 and 2. Arms 36 are connected to the piston rod 39 by drop links 38. By the arrangement of parts described in connection with Figures 1, 2 and 3, by supplying pressured air to the cylinder 40, the piston rod 39 is projected therefrom to tilt the lever arms 36 and raise the turntable platform above the top of the conveyor rollers, the wheels 33 having a lifting, rolling engagement with the under surface of plate 30 as the lever arms are tilted.

Drive apparatus is provided to rotate the turntable while it is raised above the conveyors and for this purpose a pulley 42 is keyed to the shaft 24 by a key 35 having slidable engagement with an elongated slot 35a in the shaft 24. By such arrangement the shaft 24 can slide through the pulley and a rotative drive connection nevertheless maintained between these parts. Pulley 42 is engageable by drive belts 43 from pulleys 45 powered by an air motor 46 through a gear box 47. The gear arrangement in gear box 47 is not critical to the invention and may comprise, for example, a worm 48 and a worm gear 49 illustrated in the embodiment of Figure 4 to be described. Cam lobes 31 on the lift plate 30 are adapted to engage an arm 50 of an electric switch 51 which operates to stop the motor 46 when said motor has rotated the platform 25 through a quarter turn.

The Figure 4 embodiment is similar to the Figure 1 embodiment except that the platform shaft, designated by the numeral 24', has a bottom rectangular extension 26 and a pulley 42' has a rectangular opening for receiving the extension 26 for providing a slidable but rotatable drive connection between these two parts. The sliding connection between these two parts permits the platform to lift but maintains the rotative drive connection. In this embodiment the rotative drive pulley is disposed below the lever arms 36 instead of above, but, in either case, the pulley has a slidable drive connection with the platform shaft. Also, in this embodiment the piston rod 39 is connected to a cross arm 44 between the arms 36 and no drop links are employed.

The present turntable machine may be associated with conveyor means 52 at each end thereof, further referred to hereinafter, for moving bundles onto the turntable machine and for carrying away the bundles after they have been turned.

Referring to Figure 3, a limit switch 53, which comprises a single pole, double throw switch, is mounted at the side of the apparatus adjacent one end. This switch has an arm 54 adapted to be engaged by a cam lobe 55 on an arm 56 projecting transversely into the path of a bundle moving from right to left in the direction of arrow 58. Arm 56 is spring biased in a clockwise direction and is normally held in its full line position against suitable stop means. This arm is disposed in a predetermined location so as to be engaged by the bundle when the bundle nears its centered position over the platform 25. When the arm 56 is moved counterclockwise by the bundle the lobe 55 thereon engages switch arm 54 which, as will be seen, causes the conveyor to stop and causes the cylinder 40 and motor 46 to be placed in operation.

Briefly, the automatic operation of the machine is as follows: A bundle is moved onto the rollers 15 and 16 by appropriate conveyor mechanism and the driven rollers of the turntable conveyor move the bundle into a centered position over the turntable platform 25. When the bundle reaches this centered position the rollers are stopped and the turntable platform is raised by means of the lift cylinder 40 to be in a plane above the top of the rollers. The turntable is then rotated by means of the motor 46 through 90 degrees and is stopped, whereupon the lift cylinder 40 is retracted to lower the table below the top of the rollers. The driven rollers then resume operation to discharge the bundle from the machine.

*Electrical system*

Referring particularly to Figure 5, power for the electrical system for controlling operation of the present machine is supplied by line wires L1 and L2 in which is incorporated a circuit breaker switch 57. Line wire L2 is connected to contacts on one side of a pair of push button switches 60 and 61 normally spring-held in open position. The switches 60 and 61 comprise, respectively, forward and reverse jog switches which, as will be seen, can be held closed to operate the conveyor drive motor 20 in a manually controlled operation. Connected to the other contacts of switches 60 and 61 are wires 62 and 63, respectively, in turn connected to one end of the coils for a pair of solenoid valves 64 and 65, respectively. The other ends of these coils are connected to line wire L1. The valves 64 and 65 are connected between an air supply pipe 68 and pipes 69 and 70 leading, respectively, to the forward and reverse sides of the air motor 20, and these valves are normally spring-held in closed position wherein fluid from the supply pipe 68 normally cannot flow into pipes 69 and 70. Pipes 69 and 70 are provided with adjustable check valves 72 to control the volume flow of air to the motor 20.

Included in the electrical system is a relay 75 having three contact arms 76, 77 and 78 associated, respectively, with pairs of contacts 80, 81 and 82. The coil of relay 75 is connected at one end to the line wire L1 and the other end of this coil is connected to a wire 85. Limit switch 53 has a normally open contact 86 and a normally closed contact 87. Wire 85 is also connected to the normally open contact 86 of the limit switch 53 and the normally closed contact 87 is connected to a wire 90 having a normally closed push button switch 91 therein and connected at its other end to one of the contacts 80 of the relay 75. The other contact 80 of this pair is connected to the wire 62 by means of a wire 93. The common contact of the limit switch 53 is connected to line wire L2 and, with the switch arm 54 in its normally closed position on the contact 87, a circuit is established through this switch and selector switch 91, contacts 80 of relays 75 and the coil of solenoid valve 64. Closing of this circuit energizes said solenoid valve coil to open the valve which permits pressured air to move to conveyor drive motor 20 to operate this motor in forward drive.

Also employed in the present system is a third solenoid valve 95 connected between the air supply line 68 and a pipe 96 leading to both the turntable drive motor 46 and the lift cylinder 40. A wire 98 is connected between one of the contacts 82 of the relay 75 and one end of the coil of solenoid valve 95 and, upon movement of the arm 54 of limit switch 53 into engagement with the contact 86, a circuit is established through the coil of relay 75 to shift its armature whereupon contacts 82 of the relay are closed by the arm 78 and a circuit is established through the coil of solenoid valve 95 to energize this coil and operate the valve which places the supply pipe 68 and pipe 96 into communication, the other end of the coil of relay 95 being connected to the line wire L1. Disengagement of the limit switch arm 54 from contact 87 breaks the circuit to the coil of solenoid valve 64 which shuts off the air supply to conveyor drive motor 20 to stop said motor.

The relay 75 is provided with a locking or holding circuit which passes through its set of contacts 81 and which is adapted to maintain the coil of this relay energized once the switch arm is momentarily closed on the contact 86. One of the contacts 81 is connected to a wire 100 connected at one of its ends to the wire 85 and at its other end to line wire L2, the wire 100 having a normally open push button switch 101 which, as will be seen, can be closed to manually start the operating cycle of the turntable platform. The other one of the contacts 81 is connected to a wire 103, in turn connected to a contact 104 of the switch 51. The holding circuit mentioned may be traced from L2 through switch 50, wire 103, contacts 81 of relay 75, the wire 100, wire 85, the coil of relay 75, and line wire L1. This holding circuit will hold until the switch 51 is opened by engagement of one of the cam lobes 31 on the cam plate 30 with the switch arm 50. When this holding circuit is broken, the relay returns to its normal spring-like position which means that the contact arm 76 engages the contacts 80 which again close the circuit to the coil of solenoid 64 to place the conveyor drive motor 20 in operation for operating the conveyor.

*Detailed operation*

As was described hereinbefore, the present machine operates to automatically convey a bundle partially therethrough, turn the bundle 90° and then discharge the bundle. For automatic operation, the push button jog switches 60 and 61, as well as the turntable operating switch 101, are left in their normally open position. The arm 54 of the limit switch 53 is normally closed on the contact 87, and the switches 51 and 57 are normally closed. To place the conveyor in operation the selector switch 91 is manually closed, whereby a circuit is established through the switch arm 54, switch 91, contact arm 76 of relay 75, and the coil of solenoid valve 64. This energizes the coil of solenoid valve 64 and air is admitted to the conveyor motor 20 for operating said motor in forward drive. Figure 5 illustrates the position of the control means for the operation of the mechanism thus far described. Disregarding the breaker switch 57, the conveyor will run continuously until either a bundle is moved into engagement with the arm 56 to move switch arm 54 off contact 87 or until the selector switch 91 is opened.

With the conveyor motor in operation, a bundle may be received from the conveyor 52 and carried into turning opposition above the platform 25, the platform 25 at this time being at rest at a point below the top of the rollers. The bundle advances and engages the arm 56, and upon additional movement of the bundle along the conveyor, this arm is rotated and the lobe 55 thereon engages the arm 54 of switch 53 to move this arm out of engagement with contact 87 and into engagement with the other contact 86. Disengagement of the arm 54 from the contact 87 breaks the circuit to the coil of solenoid valve 64 and air pressure to the motor 20 is cut off to stop the conveyor. The conveyor stops instantly because of friction and the low momentum of the air motor whereby the bundle does not over run.

With the arm 54 in engagement with the contact 86 of switch 53, a circuit is established through this arm and also through the wire 85 and the coil of relay 75. Energization of this coil raises the armature to bring the contact arm 77 into engagement with the contacts 81 whereby the holding circuit heretofore mentioned is established through normally closed switch 51, wire 103, the contact arm 77, wire 100, wire 85, and the coil of this relay. Although the switch arm 54 may only momentarily engage the contact 86, as such arm will return to contact 87 when the bundle turns and disengages said arm, the holding circuit will, nevertheless, be brought into operation to maintain the relay coil in energized condition, and, as long as the coil of relay 75 is energized, the contact arm 76 will be disengaged from the contacts 80, whereby even though the arm 54 returns to the contact 87, the circuit to the coil of relay 64 remains open.

With the coil of relay 75 energized, contact arm 78 engages contacts 82 and current flows through said arm and through the coil of solenoid valve 95. This energizes the coil of solenoid valve 95, and this valve then establishes communication between the air supply pipe 68 and the pipe 96 which leads to the turntable lift cylinder 40 and the turntable drive motor 46 to place said cylinder and motor in operation. The lift cylinder 40 requires a smaller volume of air than the turntable drive motor whereby the cylinder 40 lifts the platform while the turntable drive motor is getting started so that the platform 25 will clear the rollers before a turning operation is commenced. Operation of these motors thereby first raises and then turns the platform, the platform shaft sliding through the pulley in the raising and lowering movements of the platform.

When the platform is rotated through 90 degrees, a lobe 31 on the lift plate 30 engages switch arm 50 on the switch 51 to move this arm off its contact 104 and break the holding circuit for the relay 75, whereupon the armature thereof will fall and arm 78 will break contact with contacts 82 to cause deenergization of the coil of solenoid valve 95. Air pressure is thereby cut off to the lift cylinder 40 and the motor 46 and the platform will lower by gravity to place the bundle back on the conveyor. The platform continues to lower itself to its rest position below the top of the conveyor. The platform stops rotating instantly because of friction and the low momentum of the air motor whereby it does not over run.

When the coil of relay 75 is deenergized upon the breaking of the holding circuit through switch 51 and the armature returns to its rest position, the contact arm 76 again moves into engagement with the contacts 80, and as the switch arm 54 of limit switch 53 will have returned to engage contact 87 under the action of its spring, the circuit to the coil of solenoid valve 64 is again closed and the conveyor motor resumes running in the forward direction for discharging the bundle through the machine.

To shut off the machine, the selector switch 91 is opened, or to isolate the system from the power supply the switch 57 is opened. To manually control the operation of the machine, forward movement of the conveyor may be accomplished by manually holding switch 60 closed, and reverse operation of the conveyor may be accomplished by manually holding switch 61 closed. In this manual operation, switch 60 controls solenoid valve 64 and switch 61 controls solenoid valve 65. Switch 101 may be manually closed for operation of the turntable in a lifting and turning operation, and such closing of this switch will establish a circuit through the coil of relay 75 and also establish the holding circuit through switch 51 and contact arm 77 of relay 75 heretofore described, to cause the turntable platform to go through its lifting and turning cycle. Opening of this circuit is accomplished by engagement of a lobe 31 with the switch arm 50 and, therefore, even in the manual control of the machine the turntable will also automatically be stopped after rotating through a quarter turn.

It will be apparent to those skilled in the art that the present machine is capable of serving many useful purposes wherein a load is to be turned through a predetermined angle. A particular application is in connection with binding machines which bind large and heavy bales of pulp into bundles wherein these multiple bales are bound in two directions so as to be securely united into a single unit. In Figure 3, for example, the bundle B is shown as being composed of four rectangular bales.

Figure 6:
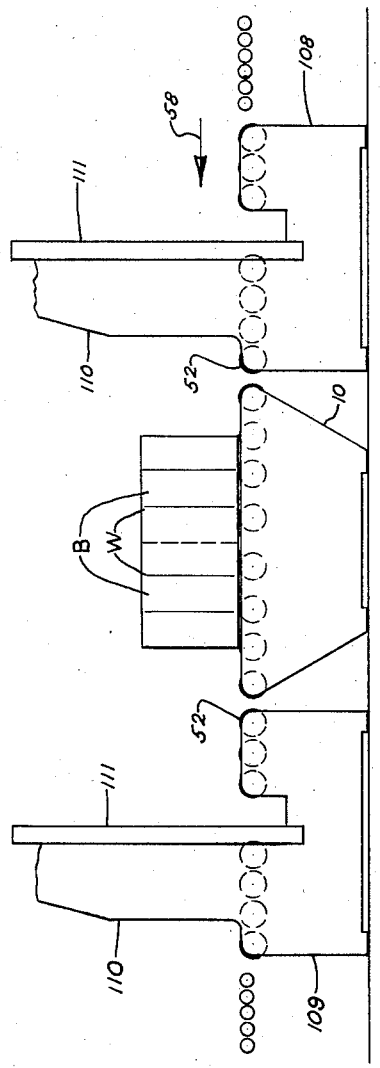
Figure 6 is an elevational view of the present turntable machine disposed between a pair of wire binding machines, with a bundle positioned over the turntable platform.
Figure 7:
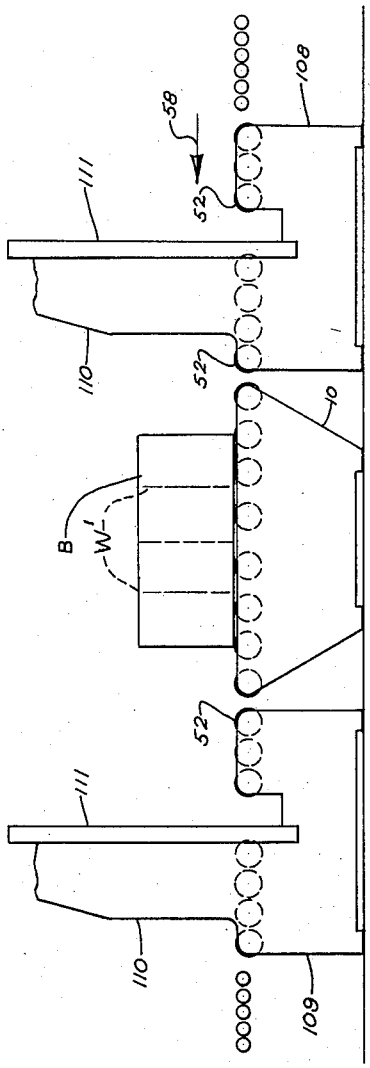
Figure 7 is a view similar to Figure 6 but showing the bundle rotated 90° in readiness to be discharged.

Referring now particularly to Figures 6 and 7 there is shown a turntable machine 10 positioned between a pair of binding machines 108 and 109 of a well-known type having an upright frame 110 supporting a wire carrier 111. These machines have power driven conveyor means 52 already mentioned in connection with Figures 1 and 2 for depositing bundles on the turntable 10 and receiving the bundle in turned condition when discharged from the turntable. In the particular tandem arrangement shown the bales are first bound in one direction in the binding machine 108 which moves such bales onto the turntable 10, Figure 6, and then the bundle is rotated 90 degrees, Figure 7, and conveyed into the binding machine 109.

It has been found that to positively unite four bales into a bundle four wire strands are preferably placed around one way and two wire strands are placed around the other way. This is illustrated in Figures 6 and 7 wherein Figure 6 shows four square bales with four wire strands W therearound in one direction and Figure 7 shows the bales rotated 90 degrees with the location of the two wires to be applied by the machine 108 being designated by the dotted lines W'. The wires W bind the bales together in two pairs and the wires W' bind the two pairs securely together in a single bundle. The problem of forming such composite bundles will be better appreciated when it is pointed out that the weight of a typical composite bundle is 600 pounds and that the bundle measures approximately 40 inches along each side and end.

The particular application for the turntable machine in connection with binding machines is for illustration purposes only and it is to be understood that the machine may be used for various other purposes. The flat top surface of the platform 25 facilitates the handling of heavy and bulky articles and serves to support such articles as bales of pulp in stable, compact position while turning.

Having now described my invention and in what manner the same may be used, what I claim as new and desire to protect by Letters Patent is:

1. A turntable machine comprising roller conveyor means for moving a load onto and off said machine, drive means for said conveyor means, a vertically movable rotatable platform located along and below said conveyor means, said platform having a raised position above the top of said conveyor for turning a load which it has lifted off said conveyor, and control means arranged to render said conveyor drive means inoperative during the lifting and turning of said platform and to render said drive means operative in response to the lowering of said platform.

2. A turntable machine comprising roller conveyor means for moving a load onto and off said machine, drive means for said conveyor means, a vertically movable rotatable platform located along and below said conveyor means, means for lifting said platform to a raised position above the top of said conveyor for turning a load which it has lifted off said conveyor, and means actuated by said load for rendering said drive means inoperative and for initiating the lifting and turning of said platform.

3. A turntable machine comprising roller conveyor means for moving a load onto and off said machine, drive means for said conveyor means, a vertically movable rotatable platform located along said conveyor means, said platform having a lower position beneath the top of said conveyor and having a raised position above the top of said conveyor for turning a load which it has lifted off said conveyor, drive means for lifting and turning said platform, and a two position switch, said switch in one position thereof causing the actuation of said conveyor drive means and in the other position causing the actuation of said platform lifting and turning drive means.

4. A turntable machine comprising roller conveyor means for moving a load onto and off said machine, fluid pressure operated drive means for said conveyor means, a vertically movable rotatable platform located along said conveyor means, said platform having a raised position above the top of said conveyor for turning a load which it has lifted off said conveyor, and having a lowered position below the top of said conveyor, solenoid valves for controlling the operation of said conveyor drive means and said platform lifting and turning drive means, and switch means actuated by said load at a predetermined position for deenergizing the solenoid valve controlling said conveyor drive means for stopping said conveyor and for energizing the solenoid valves controlling said platform lifting and turning drive means for elevating said platform and turning it through a predetermined degree of rotation.

5. A turntable machine comprising conveyor means for moving a load onto and off said machine, a vertically movable rotatable platform disposed within the path of said conveyor means, said platform having a raised position above the top of said conveyor means for turning a load which it has lifted off said conveyor and having a lowered out-of-the-way position below the top of said conveyor means, motor means for lifting said platform, motor means for turning said platform, and means operated by rotation of said platform to deenergize said motor means.

6. A turntable machine comprising roller conveyor means for moving a load onto and off said machine, fluid pressure operated drive means for said conveyor means, a vertically movable rotatable platform located along said conveyor means, said platform having a raised position above the top of said conveyor for turning a load which it has lifted off said conveyor, drive means for lifting and turning said platform, relay means having one position to energize said conveyor drive means and another position to energize said platform lifting and turning drive means, and a two position switch controlling the position of said relay means.

7. A turntable machine comprising roller conveyor means for moving a load onto and off said machine, fluid pressure operated drive means for said conveyor means, a vertically movable rotatable platform located along said conveyor means, said platform having a raised position above the top of said conveyor for turning a load which it has lifted off said conveyor, drive means for lifting and turning said platform, a relay having a deenergized position for energizing said conveyor drive means and an energized position for energizing said platform lifting and turning drive means, a holding circuit for holding said relay in said energized position, and means rotatable with said platform for breaking said holding circuit.

8. A turntable machine comprising roller conveyor means for moving a load onto and off said machine, fluid pressure operated drive means for said conveyor means, a vertically movable rotatable platform located along said conveyor means, said platform having a raised position above the top of said conveyor for turning a load which it has lifted off said conveyor, separate motor means for lifting and for turning said platform, a relay having a deenergized position for energizing said conveyor drive means and an energized position for energizing both of said motor means, a holding circuit for holding said relay in said energized position, a two position switch controlling the operation of said relay, means rotatable with said platform for breaking said holding circuit, and means engageable by said load for operating said two position switch.

9. A conveyor turntable comprising a conveyor, drive means for said conveyor, a platform co-extensive with at least at portion of said conveyor, means for lifting said platform from a lower position beneath the top of said conveyor to an upper position above the top of said conveyor, means for turning said platform, means actuated by a bundle on said conveyor for stopping said drive means and starting said lifting and turning means, and means actuated by rotation of said platform for stopping said lifting and turning means whereby said platform returns by gravity to said lower position, said last means starting said drive means.

10. A turntable machine comprising roller conveyor means for moving a load onto and off the machine, drive means for said conveyor means, a vertically movable rotatable platform located along said conveyor means, said platform having having a lower position beneath the top of said conveyor means and a raised position above said conveyor means for turning a load which it has lifted off said conveyor means, fast starting motor means for lifting said platform, slow starting motor means for turning said platform, and means enegageable by said load for deenergizing said conveyor drive means and simultaneously energizing both of said last and slow starting motor means.

11. A turntable machine as defined in claim 10, said fast starting motor means for lifting said platform comprising a fluid pressure cylinder and piston unit and said slow starting motor means for turning said platform comprising a rotary fluid motor.

12. A turntable machine comprising roller conveyor means for moving a load onto and off the machine, drive means for said conveyor means, a vertically movable rotatable platform located along said conveyor means, said platform having a lower position beneath the top of said conveyor means and a raised position above said conveyor means for turning a load which it has lifted off said conveyor means, a reciprocating motor for lifting said platform, a rotary motor for turning said platform, means engageable by said load for deenergizing said drive means and energizing said motors to stop said conveyor means and lift and turn said platform, a switch actuator connected with said platform to turn therewith, a switch actuated by rotation of said actuator, and means controlled by said switch for deenergizing said motors and energizing said drive means.

13. A turntable machine comprising roller conveyor means for moving a load onto and off the machine, a vertically movable rotatable platform located along said conveyor means, said platform having a lower position beneath the top of said conveyor means and a raised position above said conveyor means for turning a load which it has lifted off said conveyor means, a fluid pressure cyllinder and piston unit for lifting said platform, a rotary fluid motor for turning said platform, means for supplying fluid pressure to said unit and motor, a switch actuator connected with said platform to turn therewith, a switch actuated by rotation of said actuator, and means controlled by said switch for shutting off the fluid pressure supply to said unit and motor.

References Cited in the file of this patent

UNITED STATES PATENTS

| | | |
|---|---|---|
| 495,683 | Rigby | Apr. 18, 1893 |
| 1,914,806 | Hormel | June 20, 1933 |
| 2,780,340 | Hynson | Feb. 5, 1957 |
| 2,813,638 | Miller | Nov. 19, 1957 |